(12) United States Patent
Westerberg

(10) Patent No.: US 8,554,209 B2
(45) Date of Patent: Oct. 8, 2013

(54) SECTIONED COMMON CONTROL CHANNELS IN CELLULAR NETWORKS

(75) Inventor: Erik Lars Westerberg, Enskede (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1473 days.

(21) Appl. No.: 11/840,496

(22) Filed: Aug. 17, 2007

(65) Prior Publication Data

US 2009/0047957 A1 Feb. 19, 2009

(51) Int. Cl.
*H04W 4/00* (2009.01)
*H04W 36/00* (2009.01)
*H04B 7/00* (2006.01)

(52) U.S. Cl.
USPC .............. 455/434; 455/422.1; 455/432.1; 455/436; 455/443; 455/515; 370/331

(58) Field of Classification Search
USPC ........... 455/422.1, 432.1, 434, 436, 443, 515; 370/331
See application file for complete search history.

(56) References Cited

U.S. PATENT DOCUMENTS

| | | | | |
|---|---|---|---|---|
| 7,020,477 | B2 * | 3/2006 | Cramby et al. | 455/458 |
| 7,145,890 | B1 * | 12/2006 | Seo et al. | 370/331 |
| 2004/0157600 | A1 * | 8/2004 | Stumpert et al. | 455/432.1 |
| 2005/0148348 | A1 * | 7/2005 | Cramby et al. | 455/458 |
| 2005/0215253 | A1 * | 9/2005 | Johannesson et al. | 455/435.2 |
| 2005/0266845 | A1 * | 12/2005 | Aerrabotu et al. | 455/436 |
| 2006/0083205 | A1 | 4/2006 | Buddhikot et al. | |
| 2006/0166694 | A1 * | 7/2006 | Jeong et al. | 455/525 |
| 2007/0010268 | A1 * | 1/2007 | Kim et al. | 455/509 |
| 2007/0129017 | A1 * | 6/2007 | Dalsgaard et al. | 455/67.11 |

FOREIGN PATENT DOCUMENTS

| | | |
|---|---|---|
| EP | 1164733 A1 | 12/2001 |
| WO | 02/065808 A1 | 8/2002 |

\* cited by examiner

*Primary Examiner* — Olumide T Ajibade Akonai
*Assistant Examiner* — Dung Hong
(74) *Attorney, Agent, or Firm* — Coats and Bennett PLLC

(57) ABSTRACT

A propagated control channel signal for use in a shared radio access network is disclosed. The control channel signal comprises common control data for use by mobile terminals authorized to access the shared radio access network and operator-specific data for use by those of the mobile terminals that are associated with a first mobile operator. The common control data may comprise handover-related data for handovers within the shared radio access network and the operator-specific data may comprise handover-related data for handovers from the shared radio access network to an unshared radio access network having overlapping coverage with the shared radio access network. The common control data and the operator-specific data may comprise values for one or more mobile terminal settings, wherein the operator-specific values are for use instead of the common values by those of the mobile terminals that are associated with the first mobile operator. Methods and apparatus for using and generating the disclosed propagated control channel signals are also disclosed.

20 Claims, 11 Drawing Sheets

| ... | COMMON PART 410 | OPERATOR A 420 | OPERATOR B 420 | OPERATOR C 420 | COMMON PART 410 | OPERATOR A 420 | ... |
|---|---|---|---|---|---|---|---|

| COMMON PART 410 | OPERATOR A 420 | OPERATOR B 420 | OPERATOR C 420 | COMMON PART 410 | OPERATOR A 420 |

FIG. 4

SECTIONED COMMON CONTROL CHANNELS IN CELLULAR NETWORKS

BACKGROUND

1. Technical Field

The present invention generally relates to cellular radio networks, and in particular relates to sharing of a radio access network having overlapping coverage with one or more unshared radio access networks.

2. Background

A known approach for reducing the investment and cost of operating a cellular radio network involves the sharing of network resources. Rather than each building a full network, two (or more) operators share a common set of base stations, radio equipment and radio frequencies. In some cases, this shared network at least partly overlays one or more other networks. For example, two operators might share a $3^{rd}$-generation (3G) network in a particular region, while each operates its own unshared GSM network in the same area. In this example, the shared network uses a different radio access technology than the overlapping networks, e.g. Wideband CDMA (W-CDMA) versus GSM, but this is not necessarily the case.

One network sharing scenario is illustrated in FIG. 1. In this scenario, operators A and B operate radio access network (RAN) 110 and RAN 120, respectively. The cell coverage of RAN 110 and RAN 120 is pictured in FIG. 1; the two networks in this example cover generally the same area. In this scenario, operators A and B agree to share a single Long-Term Evolution (LTE) network, rather than each building its own separate network. ("LTE" refers to advanced $3^{rd}$-generation network standards under development by the $3^{rd}$-Generation Partnership Project.) The shared LTE network 130 is also pictured in FIG. 1; LTE network 130 also covers generally the same area as unshared RAN 110 and unshared RAN 120. LTE-capable terminals subscribing to either operator A's service or operator B's service are permitted to access services using shared LTE network 130.

In order to provide seamless coverage for subscribers, it is important that a shared radio access network integrate smoothly with legacy, i.e. pre-existing, radio access networks. In the example illustrated in FIG. 1, operator A would like its subscribers to perform handovers between the shared LTE network 130 and its unshared GSM network 110 whenever appropriate. Likewise, operator B requires appropriate handovers between the shared LTE network 130 and operator B's unshared GSM network 120 for its subscribers. Thus, a shared radio access network should provide interoperability between the shared RAN and unshared RANs having overlapping coverage.

One approach to supporting handovers from the shared RAN 130 to multiple unshared RANs is to configure the common control channel in the shared RAN 130 with neighbor cell lists and other radio-network design parameters relating to both of the unshared networks 110 and 120 as well as the shared network 130. Thus, a mobile terminal connected to LTE network 130 would receive neighbor cell information for neighboring cells in the LTE network 130, unshared RAN 110, and unshared RAN 120. This mobile terminal will then include the neighbor cells from all three networks in its normal scanning procedures, even though some of those neighbors are in an unshared RAN that the mobile terminal is not permitted to access.

This approach is illustrated in FIG. 2. LTE base station 210 provides coverage for LTE cell 215, which has overlapping coverage with cell 220, which is part of Public Land Mobile Network (PLMN) A, and cell 225, which is part of PLMN-B. PLMN-A and PLMN-B are operated by operators A and B respectively; mobile terminals operating in the area are affiliated with one operator or the other. As with the scenario illustrated in FIG. 1, operators A and B have agreed to share the resources of the LTE network. Thus, subscribers of both operators have access to the services provided by LTE base station 210 when in the coverage area. Base station 210 and LTE cell 215 are part of a shared RAN; PLMN-A and PLMN-B are unshared RANs.

Base station 210 transmits LTE radio signal 240, which carries control channel signal 250 as well as one or more traffic channel signals. In the scenario illustrated in FIG. 2, control channel signal 250 includes neighbor cell data corresponding to LTE neighbor cells as well as to cell 220 and cell 230. In certain circumstances, a mobile terminal accessing LTE cell 215 might require handover to an underlying GSM cell—if the mobile terminal is a subscriber of operator A (or to an affiliated operator) it will be handed off to cell 220; if a subscriber of operator B it will be handed off to cell 230. Because the control channel signal 250 identifies both of these cells as neighbors, i.e. potential handoff targets, the mobile terminal will have up-to-date information for each target when handoff is needed.

However, this approach has several limitations. First, because all mobile terminals receive the same control channel information, the idle-mode behavior of mobiles belonging to operator A cannot be controlled independently of the idle-mode behavior of mobiles belonging to operator B. For example, discontinuous receive (DRX) cycles cannot be set differently for mobile terminals affiliated with the different operators.

Second, neighbor cell identification information for GSM cells belonging to network A is broadcast on the LTE common control channel, and those cells are scanned by mobile terminals belonging to network B, even though these mobile terminals will not be handed off to any of those cells. Likewise, mobile terminals belonging to network A will receive control channel information identifying neighbor cells in network B. This leads to an unnecessarily large number of neighbor cells for the terminals to track and measure. Because the quality of signal strength measurements is a function of the time devoted to the measurements, this in turn leads to unnecessarily degraded measurement information.

With this approach, other cell parameters, such as signal strength thresholds indicating when to start measurements on GSM cells, are also common for all terminals and cannot be set by operator A and B separately. Depending on the design of the underlying networks, the cell parameters may be optimal for only one of the underlying networks, or for neither. This can lead to poor radio performance, and in some cases can lead to an increase in dropped calls.

In addition, the two operators may desire different criteria for when a mobile terminal should leave the LTE network in favor of the respective GSM network, depending on, for example, pricing terms for using the shared network, coverage and performance of the legacy networks, available services, and so on. Likewise, at any given time the two underlying networks may be experiencing dramatically different loading conditions, so that the operators have different objectives with respect to balancing loads between the LTE network and the underlying GSM networks. This fine tuning of network performance is not possible with a common set of radio-network parameters in the common control channel.

Finally, control channel information in the scenario of FIG. 2 also dictates identical behavior for all receiving mobile terminals with respect to the LTE network. This creates challenges for a scenario where only part of the LTE network is shared. One such scenario arises when only macro cells of the LTE network are intended to be shared, while only mobile terminals associated with one operator are allowed access to micro cells. In this scenario, the micro cells make up an unshared RAN, even though the micro cells are part of the same physical network as the macro cells. However, because the common control channel information is shared by all mobile terminals, regulating access to those micro cells is difficult.

Another approach to sharing physical network resources that addresses some of the above problems is to configure two independent cells in the same radio base station. This approach is pictured in FIG. 3. LTE base station 310 transmits a signal comprising parts 320 and 325, each covering 10 MHz of the total 20 MHz available. Part 320 comprises a first control channel signal 330 and corresponding traffic channel signals for users associated with operator A, while part 325 comprises a second control channel signal 335 and corresponding traffic channel signals for users associated with operator B. Thus, a single base station 310 simultaneously serves two independent LTE cells 340 and 345, which overlay GSM cells 350 and 355.

Because this approach results in two distinct control channels signals 320 and 325, operation of mobile terminals associated with operators A and B may be controlled independently. While this approach addresses the issues of idle-mode behavior and cell selection, the result is that there is incomplete sharing of the network resources, since operators A and B can each use only half of the available LTE spectrum. This leads to non-optimal peak rate performance.

SUMMARY

A propagated control channel signal for use in a shared radio access network is disclosed. The control channel signal comprises common control data for use by mobile terminals authorized to access the shared radio access network and operator-specific data for use by those of the mobile terminals that are associated with a first mobile operator. The common control data may comprise first handover-related data for handovers within the shared radio access network, and the operator-specific data may comprise second handover-related data for handovers from the shared radio access network to a first unshared radio access network having overlapping coverage with the unshared radio access network.

In some embodiments, the first handover-related data comprises one or more first handover criteria for initiating handovers within the shared radio access network, and the second handover-related data comprises one or more second handover criteria for initiating handovers from the shared radio access network to the first unshared radio access network. In one or more embodiments, the first handover-related data comprises first neighbor cell data identifying one or more intra-RAN handover target cells in the shared radio access network and the second handover-related data comprises second neighbor cell data identifying one or more inter-RAN handover targets in the first unshared radio access network. In some embodiments, the first neighbor cell data may correspond to macro cells of the shared radio access network and the second neighbor cell data may correspond to micro cells in the first unshared radio access network.

In one or more embodiments, the operator-specific data is mapped to a group of subcarriers or resource blocks within the propagated control channel signal and the common control data comprises mapping data characterizing that mapping. The propagated control channel signal may comprise an OFDM signal for use in a LTE system.

In one or more embodiments, the common control data and the operator-specific data may comprise values for one or more mobile terminal settings, wherein the operator-specific values are for use instead of the common values by those of the mobile terminals that are associated with the first mobile operator. The mobile terminal settings may include, for example, parameters related to discontinuous receive (DRX) operation, such as a DRX cycle parameter. In other embodiments, the operator-specific data may comprise service-specific data identifying a service available to mobile terminals associated with the first mobile operator or providing configuration data for using a mobile service.

In some embodiments, the propagated control channel signal further comprises second operator-specific data for use by those of the mobile terminals accessing the shared radio access network that are associated with a second operator or a second unshared radio access network. The second operator-specific data may comprise one or more second handover criteria for handovers to the second unshared radio access network, and may comprise second neighbor cell data identifying inter-RAN handover targets in the second unshared radio access network.

Methods and apparatus for using the disclosed propagated control channel signals are also disclosed. In an exemplary method, a wireless device receives a propagated control channel signal; processes common control data included in the propagated control channel signal for use by mobile terminals authorized to access a shared radio access network; determines whether the wireless device is associated with a first mobile operator; and, based on said determining, selectively processes operator-specific data included in the control channel signal for use by those of the mobile terminals that are associated with the first mobile operator. The method may further comprise determining, from the common control data, a location within the propagated control channel signal for the operator-specific data and extracting the operator-specific data from the determined location.

In some embodiments of the above-described method, the common control data identifies one or more intra-RAN handover target cells in the shared radio access network and the operator-specific data identifies one or more inter-RAN handover target cells in an unshared radio access network having overlapping coverage with the shared radio access network. In these embodiments, the method may further comprise scanning the intra-RAN handover target cells and selectively scanning the inter-RAN handover target cells, depending on whether the wireless device is associated with the unshared radio access network.

In other embodiments, the operator-specific data comprises one or more handover criteria for handovers to the unshared radio access network and the method further comprises selectively evaluating the handover criteria, based on whether the wireless device is associated with the unshared radio access network, and selectively initiating a handover to an inter-RAN target cell identified by the operator-specific data, based on the evaluation of the handover criteria.

A wireless device for use in a shared radio access network is also disclosed. In one or more embodiments, the wireless device comprises a receiver configured to receive a propagated control channel signal and a control channel processor operatively connected to the receiver and configured to process common control data included in the propagated control channel signal for use by mobile terminals authorized to access the shared radio access network; determine whether the wireless device is associated with a first mobile operator;

and, based on the determination, selectively process operator-specific data included in the propagated control channel for use by those of the mobile terminals that are associated with the first mobile operator. Further embodiments of the wireless device are configured to carry out one or more of the various disclosed methods for using the propagated control channel signal.

Also disclosed is a method for producing a propagated control channel signal for use in a shared radio access network. An exemplary embodiment comprises forming a common control data part for use by mobile terminals authorized to access the shared radio access network, forming an operator-specific data part for use by those of the mobile terminals that are associated with a first mobile operator, and generating the propagated control channel signal from the common control data part and the operator-specific part. The propagated control channel signal thus formed may comprise any of the control channel signal embodiments disclosed in detail herein.

BRIEF DESCRIPTION OF THE DRAWINGS

FIG. 4 illustrates logical components of an exemplary control channel signal according to one or more embodiments of the invention.

DETAILED DESCRIPTION

Figure 1:
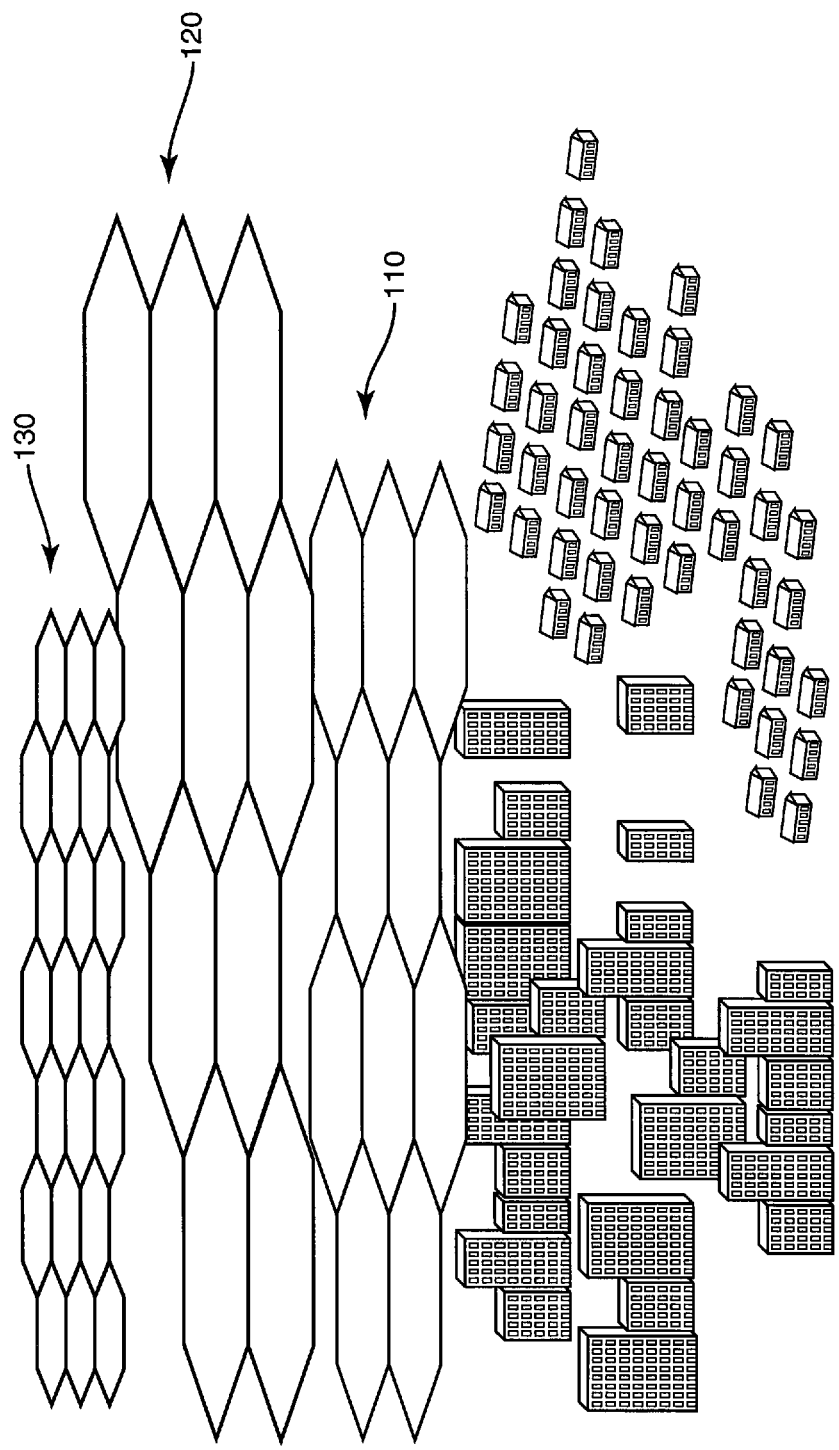
FIG. 1 illustrates a shared radio access network (RAN) having overlapping coverage with two unshared RANs.
Figure 2:
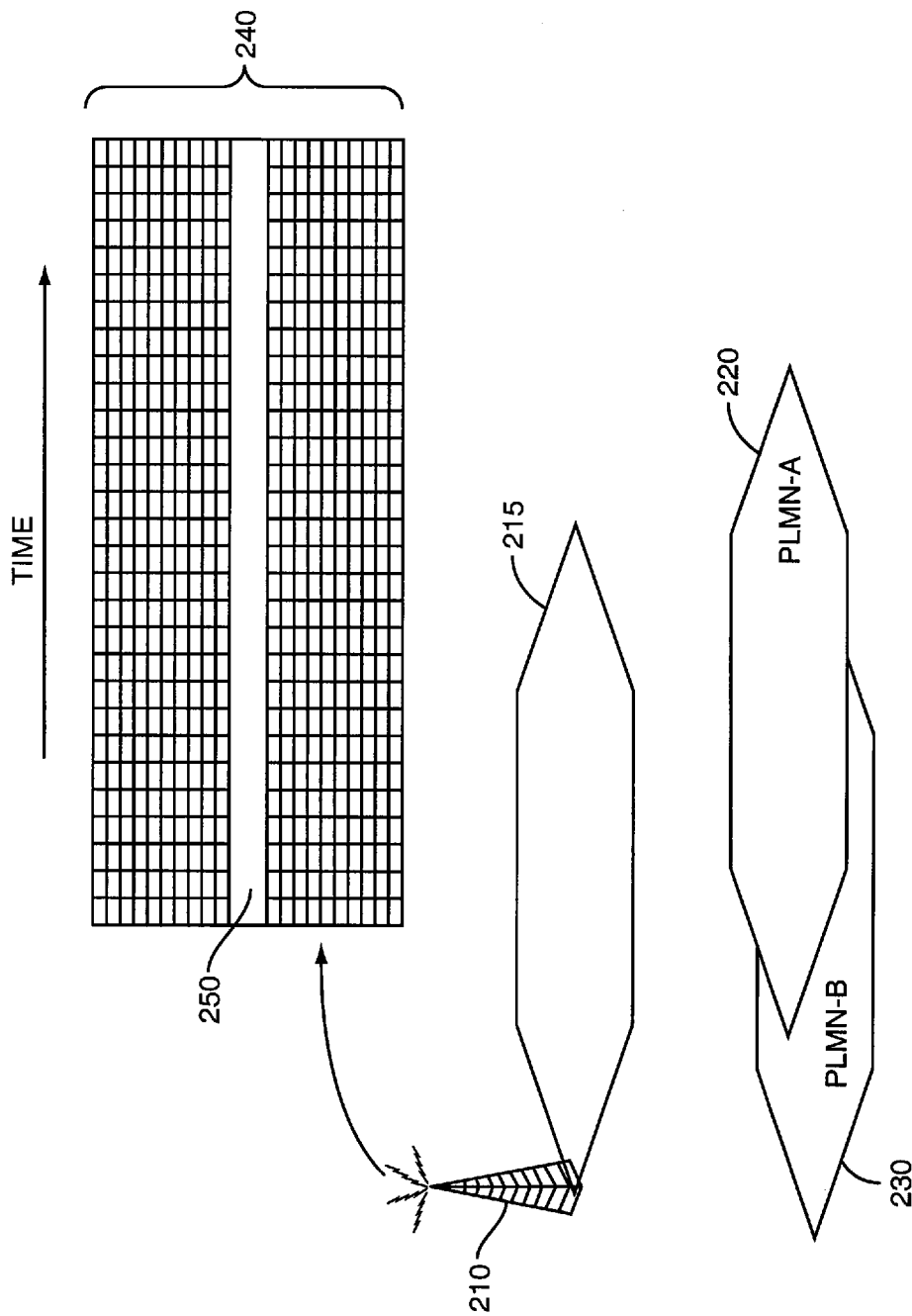
FIG. 2 illustrates a propagated signal for use in a shared RAN.
Figure 3:
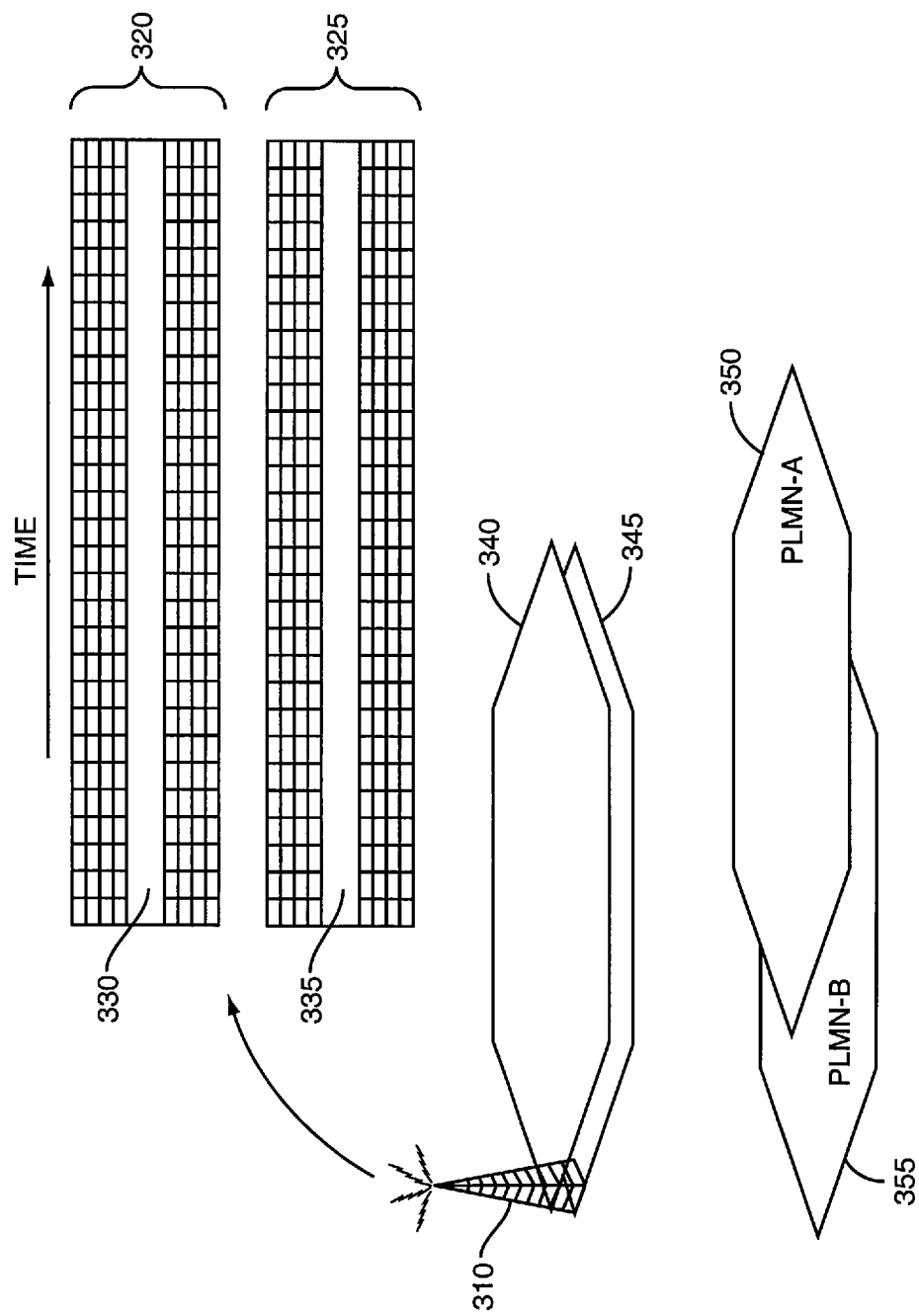
FIG. 3 illustrates another propagated signal for use in a shared RAN.

The present invention provides a novel structure for a propagated control channel signal, as well as methods for generating and processing the new control channel signal. Although the following description illustrates the present invention as applied to an LTE system, in several cases overlaying one or more GSM systems, those skilled in the art will recognize that the techniques of the present invention may be applied to other wireless communications systems and network configurations. In the following description, the terms "mobile terminal" and "wireless device" may be used interchangeably, and may refer to such devices as a cellular radiotelephone; a device that combines a cellular radiotelephone with data processing and data communications capabilities; a personal digital assistant (PDA) that includes a radiotelephone, Internet/intranet access, Web browser, organizer, calendar and/or a global positioning system (GPS) receiver; or a conventional laptop and/or palmtop receiver or other appliance that includes a wireless communications transceiver.

The sectioned common control channel described herein can be used in a variety of shared network scenarios. The propagated common control channel signal is constructed in such a way that it supports mobile terminals from multiple Public Land Mobile Networks (PLMNs). In other words, mobile terminals associated with two or more operators may be authorized to access a shared radio access network (RAN)/ In some cases, the shared RAN may have overlapping coverage with at least one unshared RAN. In this scenario, only some of the mobile terminals that are authorized to access the shared RAN are allowed to access the unshared RAN. In particular, those mobile terminals that are associated with the operator (or an affiliate of the operator) of the unshared RAN are permitted to access both the shared RAN as well as the unshared RAN. Although the following discussion describes in detail scenarios involving one or two unshared RANs, those skilled in the art will recognize that the present invention may be applied to more than two.

A simplified view of a propagated control channel signal in accordance with the present invention is illustrated in FIG. 4. The control channel signal 400 comprises multiple logical subchannels, including a common part 410 and one or more several operator-specific parts 420. This logical subchannel structure is repeated over time.

Common part 410 includes common control data that is for use by all mobile terminals in the cells. Operator-specific parts 420, on the other hand, include operator-specific data that is for use only by those of the mobile terminals that are associated with a specific operator. The propagated control channel signal 400 illustrated here is particularly useful in a shared RAN that overlaps coverage with at least two unshared RANs. For instance, operators A and B may operate GSM networks that have overlapping coverage with the shared RAN associated with control channel signal 400. Operator C may operate a third unshared GSM network, or may rely exclusively on the shared network resources. In the latter case, operator C may still wish to independently control certain aspects of operation for its affiliated mobile terminals.

The diagram of FIG. 4 illustrates the division of propagated control channel signal 400 into logical subchannels. Those skilled in the art will appreciate that these logical subchannels may be mapped onto the physical signal in a variety of ways. For example, an LTE system utilizes Orthogonal Frequency Division Multiplexing (OFDM) technology for downlink signals. As will be well understood by those skilled in the art, OFDM is a digital multi-carrier modulation scheme employing a large number of closely-spaced orthogonal sub-carriers. Each sub-carrier is separately modulated using conventional modulation techniques, including quadrature amplitude modulation (QAM). In the time domain, the signal is divided into slots—a single slot comprises 6 or 7 symbols for each subcarrier frequency. The downlink signal is further organized into groups of 12 adjacent subcarriers—a "resource block" comprises one of these groups of subcarriers for one time slot. The LTE Common Control Physical Channel (CCPCH) is transmitted using the 72 active subcarriers centered on the "DC" subcarrier, i.e. the subcarrier at the center of the allocated spectrum. The transport channel Broadcast Channel (BCH) is mapped to the CCPCH.

One convenient way of mapping the logical subchannels discussed above onto the physical channel of an OFDM signal is to map the common part 410 to a consecutive series of resource blocks. Operator-specific parts 420 can be interleaved between the common part 410 resource blocks, or may be mapped to resource blocks occupying adjacent groups of subcarriers. A common part 410 according to the present invention may be mapped to a known set of resource blocks within the CCPCH, so that it is readily found and decoded by mobile terminals. The common part 410 may also include mapping data that indicates where the operator-specific parts 420 may be found within the physical channel. Thus, once a mobile terminal has decoded common control data, it can determine from this mapping data precisely where pertinent operator-specific data is located. This mapping data might indicate a subset of subcarriers that are allocated to a particular operator-specific part, or may identify a more complicated mapping of resource blocks to one or more operator-specific parts. Non-pertinent operator-specific data, i.e. data intended for subscribers of other operators, can thus be ignored by a given mobile terminal. Indeed, resource elements corresponding to those non-pertinent operator-specific blocks need not even be decoded.

Figure 5:
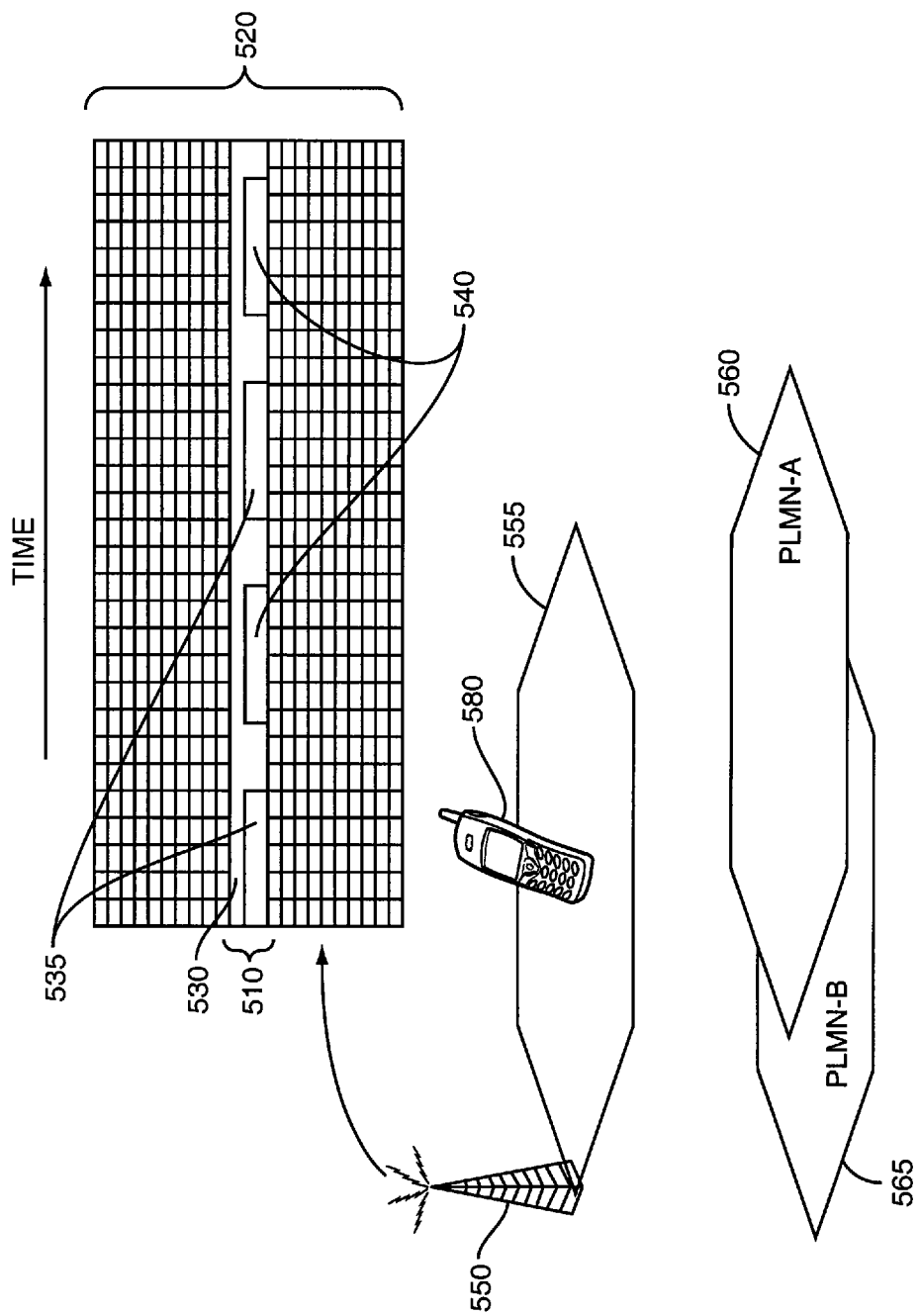
FIG. 5 illustrates an exemplary propagated signal for use in a shared RAN.

FIG. 5 illustrates the use of an exemplary propagated control channel signal 510 in a shared RAN cell 555 having overlapping coverage with two unshared RAN cells 560 and 565. LTE signal 520 comprises the control channel signal 510 and one or more traffic channels mapped to resource blocks on either side of control channel signal 510. Control channel signal 510 comprises a common part 530, a recurring operator-A part 535, and a recurring operator-B part 540. LTE signal 520 is transmitted by LTE base station 550, which serves LTE cell 555. LTE base station 520 is part of a shared LTE radio access network that has overlapping coverage with unshared GSM networks operated by operator A and operator B; LTE cell 555 in particular has overlapping coverage with PLMN-A cell 560 and PLMN-B cell 565.

It should be noted that the LTE network may be owned by either Operator A or Operator B and subject to a sharing agreement between the two parties, or may be jointly owned. In other cases, a third party may own the shared RAN. In any case, maintenance and day-to-day operation may be the responsibility of yet another legal entity. In addition, LTE base station 520 may be physically co-located with base station equipment serving either PLMN-A cell 560 or PLMN-B cell 565, or both. Indeed, physical resources, such as the antenna mast, power supplies, and so on, may be shared between LTE base station 520 and one or both of the base stations serving PLMN-A and PLMN-B.

It should also be noted that the illustrated control channel signal 510 is useful in situations where there is only a shared RAN, without any overlapping unshared cells. In this scenario, the operator-specific data 535 and 540 is used to independently govern the behavior of groups of mobile terminals 580 corresponding to the respective mobile operators as they operate in the shared LTE cell 555.

Figure 6:
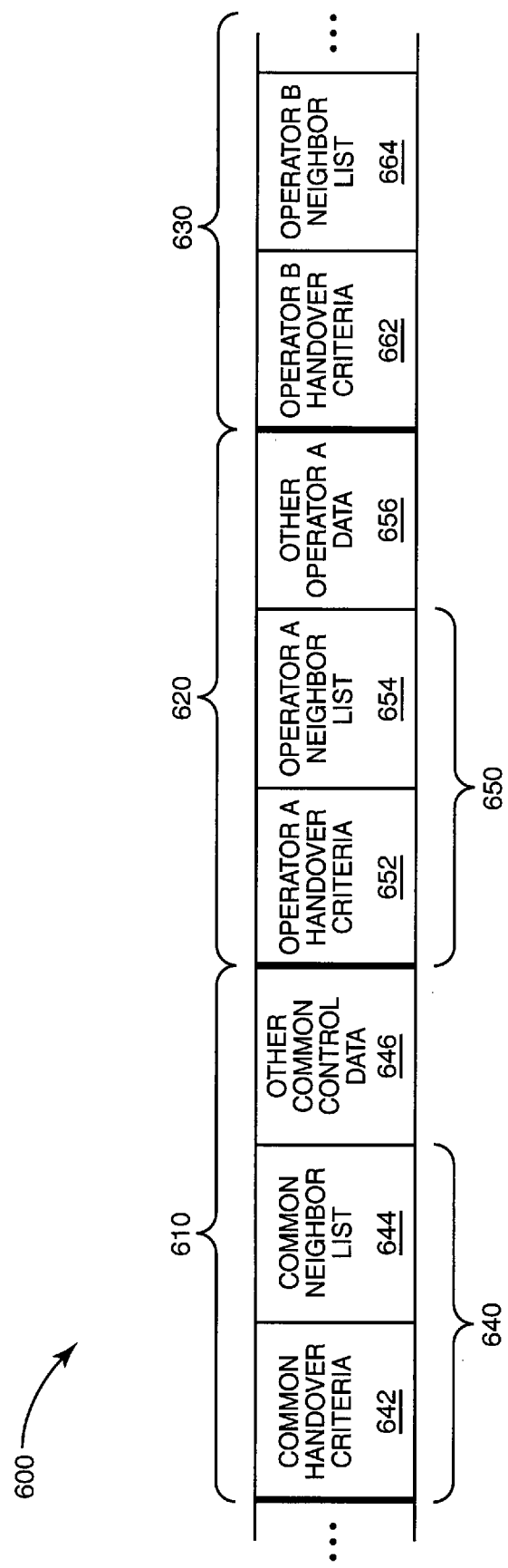
FIG. 6 illustrates logical components of an exemplary control channel signal.

FIG. 6 illustrates an exemplary logical control channel structure that might be used in the system pictured in FIG. 5. Common control channel signal 600 comprises common control data 610, first operator-specific data 620, and second operator-specific data 630. Operator-specific data 620 and 630 correspond to operators A and B, respectively.

Common control data 610 comprises common handover-related data 640, which comprises common handover criteria data 642 and common neighbor list data 644. Common control data 610 may further comprise other common control data 646, as pictured in FIG. 6. Similarly, operator-specific data 620 comprises operator-specific handover-related data 650, which may include operator-specific handover criteria 652 and operator-specific neighbor information 654. Operator-specific data 620 may also comprise other operator-specific data 656. Control channel 600 may include operator-specific data for several operators—here, the signal carries operator-specific data for operators A and B.

Referring back to FIG. 5, mobile terminal 580 is pictured in LTE cell 555; because the coverage areas overlap, mobile terminal 580 is also capable of receiving GSM signals broadcast in cells 560 and 565. In addition, mobile terminal 580 may be able to perceive signals from adjacent cells (not shown) in any or all of the three networks. Upon entering LTE cell 555, or upon being switched on, mobile terminal 580 finds LTE signal 520, using conventional methods. In idle mode, then, mobile terminal 580 receives and processes the propagated common control channel signal 510. In particular, mobile terminal 580 receives and processes the common control data 610, mapped to common part 530. In addition, mobile terminal 580 processes operator-specific data 610, mapped to operator-specific parts 535, if the mobile terminal is associated with operator A. On the other hand, if mobile terminal 580 is associated with operator B, then operator-specific data 620, mapped to operator-specific parts 540, is processed. None of the operator-specific parts 535 and 540 are processed by terminals that are allowed access to the shared LTE RAN but are not associated with either operator A or operator B.

Figure 7:
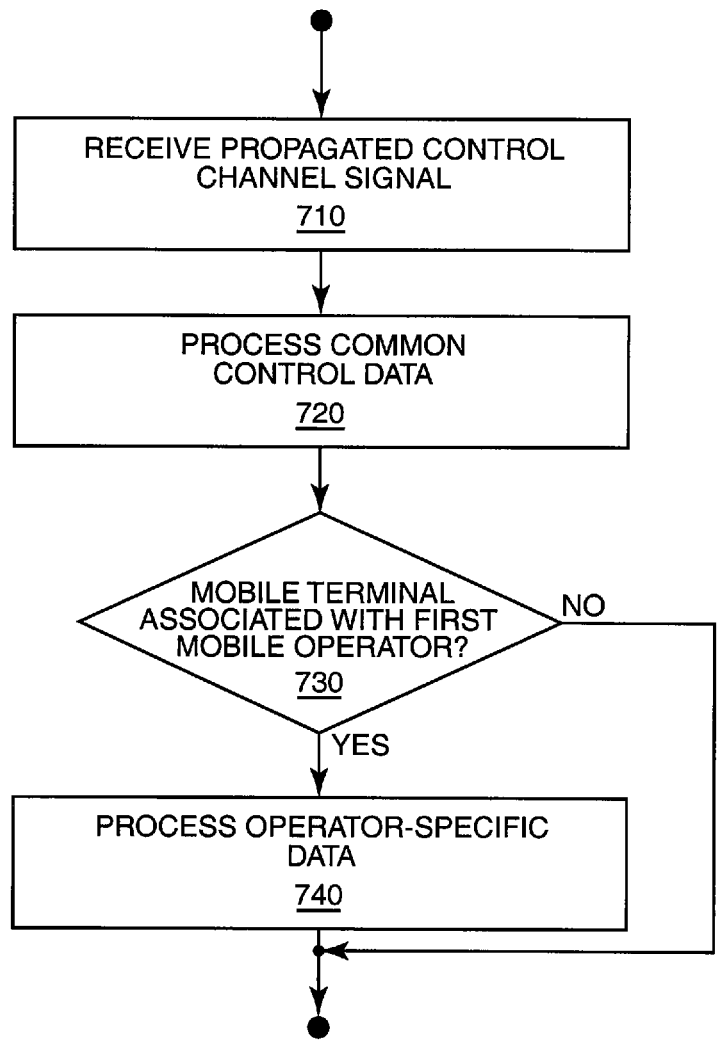
FIG. 7 is a flow diagram illustrating an exemplary method for processing a propagated control channel signal.

An exemplary method for processing a propagated control channel signal 600 according to the present invention is illustrated in the flow diagram of FIG. 7. The flow begins with receiving the propagated control channel signal at block 710. In the system described above, the propagated control channel signal is part of a downlink LTE signal, and may be received using an LTE-compatible OFDM receiver. As pictured in FIG. 6, the propagated control channel signal includes common control data 610 and operator-specific data 620.

At block 720, the common control data 610 is processed. As explained above, this data is intended for use by any mobile terminal authorized to access the shared radio access network. Indeed, a mobile terminal 580 may need to receive and process the common control data 610 in order to determine whether it is authorized to access the shared RAN. Common control data 610 may include an identifier, such as a PLMN identifier, that indicates which operator or operators that the shared RAN is affiliated with.

At block 730, mobile terminal 580 determines whether or not it is associated with a specific mobile operator. A mobile terminal 580 can determine whether it is associated with a particular operator by comparing, for example, a PLMN identifier broadcast in the common control data 610 to PLMN identifiers stored in its Subscriber Identity Module (SIM). Identifiers other than PLMN identifiers may also be used to identify mobile operator. In addition to the PLMN or operator identifier corresponding to a mobile terminal's "home" network and operator, the SIM may also identify one or more PLMNs/operators corresponding to "preferred" operator partners of the subscriber's service provider. The SIM may also identify "forbidden" PLMNs, to which access is expressly forbidden. Thus, mobile terminal 580 may determine that operator-specific data 620 in the control channel signal 600 is associated with the subscriber's own service provider, or is associated with a service provider having a cooperative relationship with the subscriber's provider. In either event, then, the specific mobile operator, and thus the operator-specific data, is associated with mobile terminal 580.

At block 740, mobile terminal 580 selectively processes operator-specific data 620, based on whether the mobile terminal 580 is associated with the corresponding mobile operator. As explained earlier, common control data 610 may include information describing the location within the control channel signal 600 of operator-specific data 620. This mapping data will typically reference operator-specific data 620 by a PLMN corresponding to the unshared RAN. Thus, if mobile terminal 580 has determined that it is not associated with that particular operator, then it need not process operator-specific data 620 at all. On the other hand, if mobile terminal 580 determines that it is associated with that operator then mobile terminal 580 proceeds to extract operator-specific data 620 from the location indicated by the mapping data, and to further process it. This extracting of operator-specific data 620 may comprise extracting data from one or more subcarriers allocated to an operator-specific subchannel, or from several resource blocks assigned to an operator-specific subchannel.

In some cases, the identity of the operator or operators corresponding to operator-specific data 620 may not be included in common control data 610, but may instead be obtained from within the operator-specific data 620. In this case, mobile terminal 580 must process enough of operator-specific data 620 to determine whether mobile terminal 580 is associated with the corresponding mobile operator. If it is, then mobile terminal 580 proceeds to process the rest of operator-specific data 620. If not, mobile terminal 580 checks other operator-specific subchannels, if any, and proceeds accordingly. If mobile terminal 580 is not associated with any operator corresponding to the operator-specific data, then the idle-mode behavior of mobile terminal 580 is governed solely by common control data 610.

Figure 8:
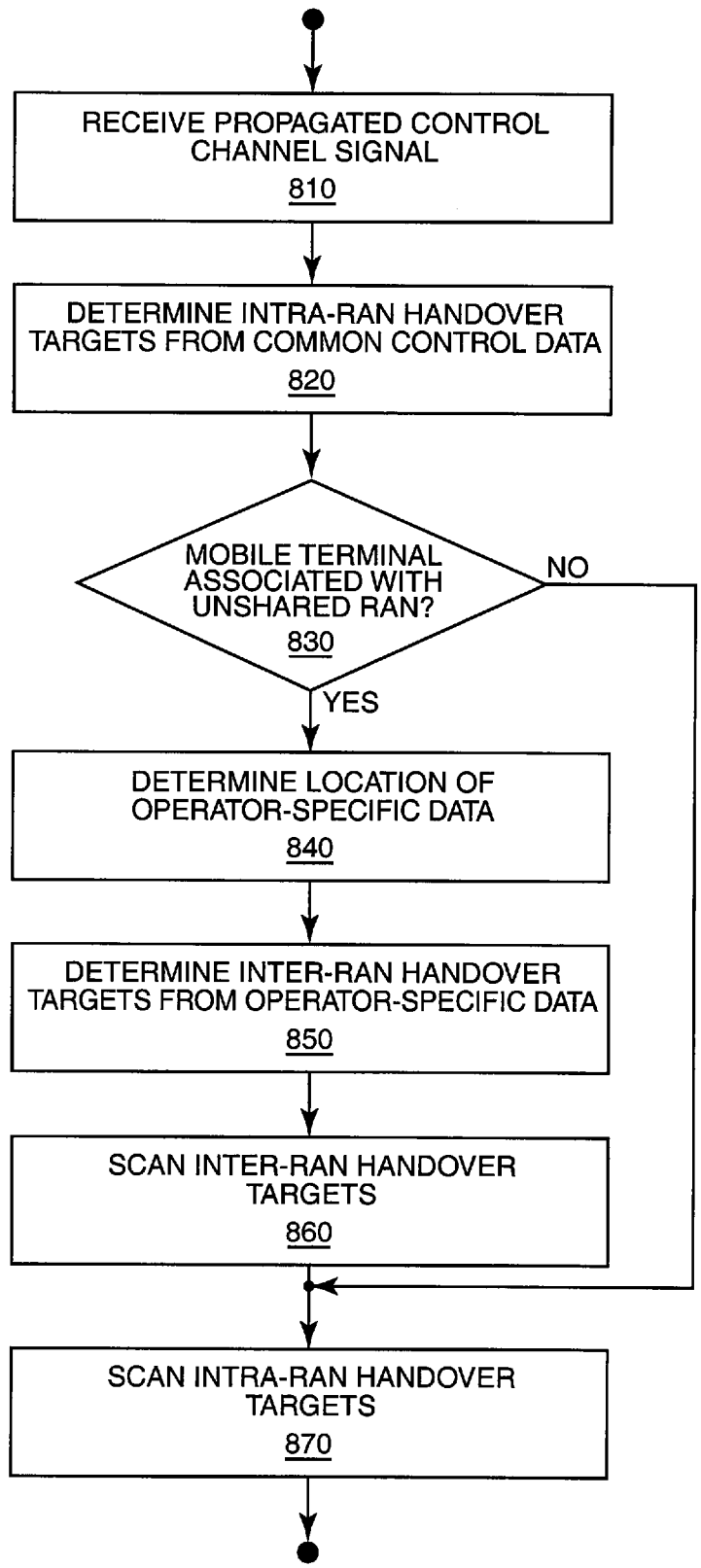
FIG. 8 is a flow diagram illustrating another exemplary method for processing a propagated control channel signal.

FIG. 8 provides, in further detail, a method for processing a propagated control channel signal that may be applicable to one or more embodiments of the present invention. The exemplary method illustrated in FIG. 8 is of particular use in a shared RAN having overlapping coverage with one or more unshared RANs. At block 810, the propagated control channel signal 600 is received by mobile terminal 580. At block 820, mobile terminal 580 determines intra-RAN handover target cells from the common control data 610. In particular, common neighbor list 644, as pictured in FIG. 6, identifies one or more neighbor cells in the shared RAN. These neighbor cells are potential destinations for a handover within the shared RAN, i.e. an intra-RAN handover.

At block 830, mobile terminal 580 determines whether it is associated with an unshared RAN having overlapping coverage with the shared RAN. In effect, mobile terminal 580 determines whether it is associated with the operator of the unshared RAN. If so, mobile terminal 580 determines a location within the control channel signal 600 for the operator-specific data 620, as pictured at block 840. Mobile terminal 580 then reads operator-specific data 620 corresponding to that unshared RAN, and determines inter-RAN handover target cells, at block 850. Referring once more to FIG. 6, operator-specific neighbor list 654 identifies one or more neighbor cells in the unshared RAN; these neighbor cells are potential destinations for a handover from the shared RAN to the unshared RAN, i.e. an inter-RAN handover.

At block 860, inter-RAN target cells are scanned if mobile terminal 580 is associated with the unshared RAN. Otherwise, block 860 is skipped. In either case, intra-RAN target cells are scanned at block 870. Those skilled in the art will recognize that limited time intervals are available for scanning neighbor cells. As a result, scanning cells that are not potential targets for handover is wasteful—that time is better spent making better measurements of actual targets. The method pictured in FIG. 8 facilitates the efficient use of scanning time, since target cells in the unshared RAN are only scanned if mobile terminal 580 is associated with that RAN. If it is not, mobile terminal 580 scans only the intra-RAN target cells.

Those skilled in the art will also recognize that the method illustrated by FIG. 8 may be extended for the situation where a shared RAN overlays two or more unshared RANs. In that case, the propagated control channel signal 600 will include two or more operator-specific parts, such as the operator-specific data 620 and 630 pictured in FIG. 6. Common neighbor cell data will be processed by all mobile terminals having access to the shared RAN. However, neighbor cells identified by operator-specific data 620 or 630 will only be scanned by mobile terminals that are associated with the corresponding unshared RAN. Note that it is possible that mobile terminal 580 is associated with both unshared RANs; in this event, mobile terminal 580 may be configured to process operator-specific data associated with each and to scan neighbor cells in both.

As described above, control channel signal 600 may comprise other handover-related data, in addition to the neighbor cell information just described. In particular, control channel signal 600 may include common handover criteria 642, which are used to evaluate intra-RAN handovers, as well as operator-specific handover criteria 652, which are used to evaluate intra-RAN handovers to the unshared RAN corresponding to operator-specific data 620. These elements are pictured in FIG. 6, which also depicts operator-specific handover criteria 662 and operator-specific neighbor data 664, corresponding to a second unshared RAN.

Control channel signal 600 may also include other common control data 646, as well as other operator-specific control data 656. This other data may include or indicate values corresponding to one or more mobile terminal settings that regulate mobile terminal behavior, other than handovers, in idle mode. For example, other common control data 646 might include a value for a discontinuous receive (DRX) parameter that controls the period of a DRX cycle. This parameter is used to determine how often mobile terminal 580 must "wake up" to monitor a paging channel. Different operators may have different objectives with respect to the competing objectives of responsiveness and battery life, and may therefore wish to set different cycle times for their associated mobile terminals.

In some embodiments, the common control data 646 and operator-specific data 656 may be used to differentiate between services available to different groups of mobile terminals. For instance, "Operator A", perhaps the owner of the shared RAN, may wish to offer mobile television services using, for example, Multimedia Broadcast Multicast Service. Operator A, while allowing mobile terminals associated with other mobile operators to access the shared RAN, may decide to offer this service only to Operator A's customers. Alternatively, Operator B, whose terminals are permitted to access the shared RAN, may decide not to invest in the network software and infrastructure necessary to support the service. Thus, Operator A and Operator B would prefer that the availability of the service be announced only to mobile terminals associated with Operator A. Those skilled in the art will readily appreciate that the sectioned control channel and the methods described herein may be readily adapted to accommodate this situation.

Accordingly, operator-specific data 656 may include service-specific data for use by mobile terminals 580 affiliated with the mobile operator corresponding to the operator-specific data 656. This service-specific data may announce, or identify, that a particular service or set of services is available. In addition, or alternatively, this service-specific data may include one or more parameters used to configure the receiving mobile terminal 580 to use the service. Common control data 646 may include no corresponding service-specific data at all, or it may include service-specific data that differs in the details.

Figure 9:
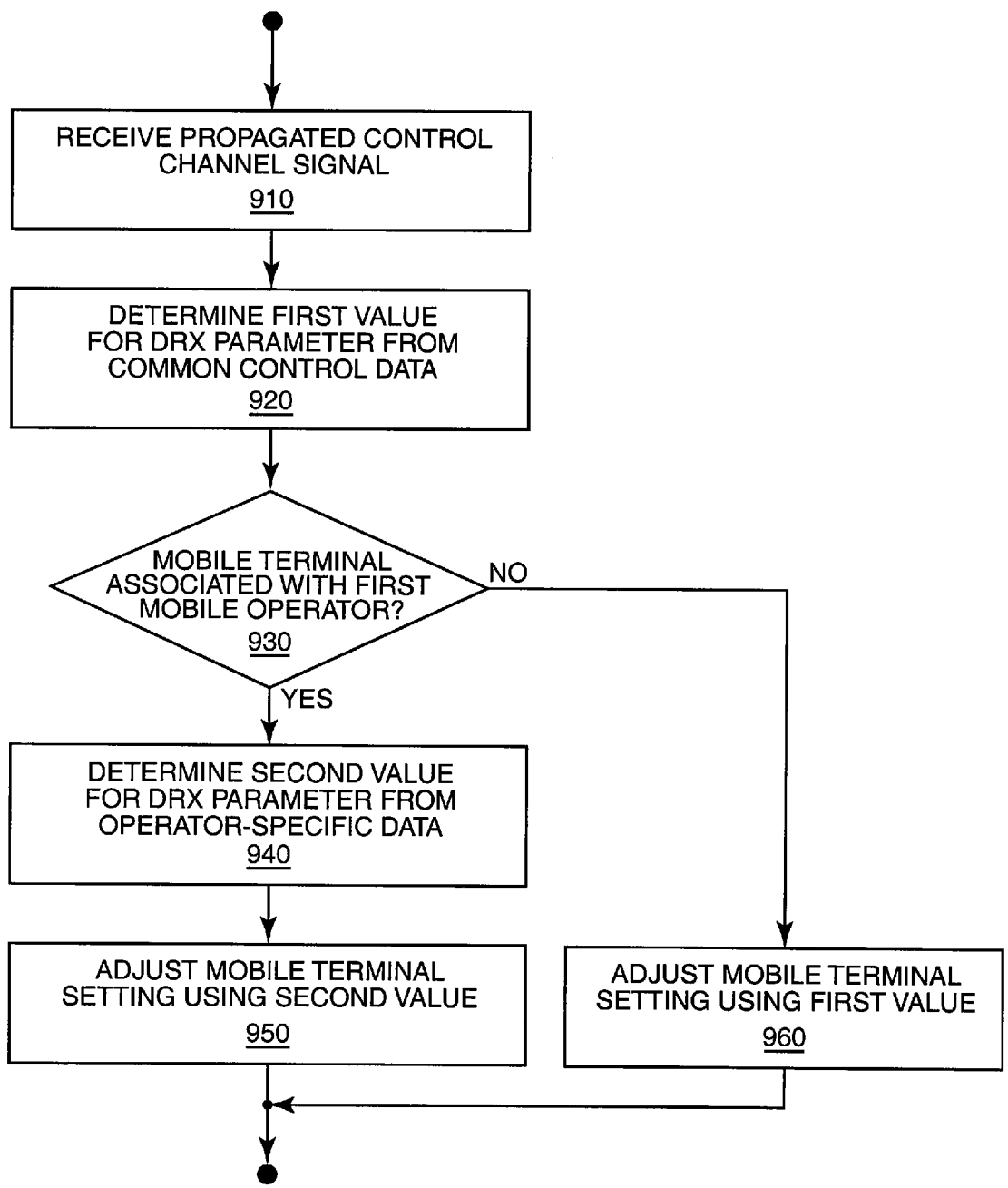
FIG. 9 is a flow diagram illustrating another exemplary method for processing a propagated control channel signal.

An exemplary method for setting mobile terminal parameters is illustrated in FIG. 9. At block 910, the propagated control channel signal 610 is received, as was seen in the previous examples. At block 920, a first value for a DRX parameter, such as a DRX cycle time, is determined from the common control data 610. At block 930, mobile terminal 580 determines whether it is associated with a first mobile operator. As discussed above, this first mobile operator may or may not control an unshared RAN having overlapping coverage with the shared RAN. In any event, if the mobile terminal operator is associated with the first mobile operator then a second value for the DRX parameter is determined from the operator-specific data 620 at block 940, and the corresponding mobile terminal setting is adjusted, using that second value, at block 950. If mobile terminal 580 is not associated with the unshared RAN, the mobile terminal setting is adjusted, using the first value, at block 960.

In the illustrated method, the operator-specific value overrides the "common" value for those mobile terminals associated with the unshared RAN. In other words, mobile terminals associated with the first mobile operators use the operator-specific value. Other terminals use the common value. Again, this method may be extended for a case where the shared RAN control channel signal contains operator-specific data fields corresponding to two or more operators. However, in either case the operator-specific value may be used to preempt, or over-ride, the common value.

Figure 10:
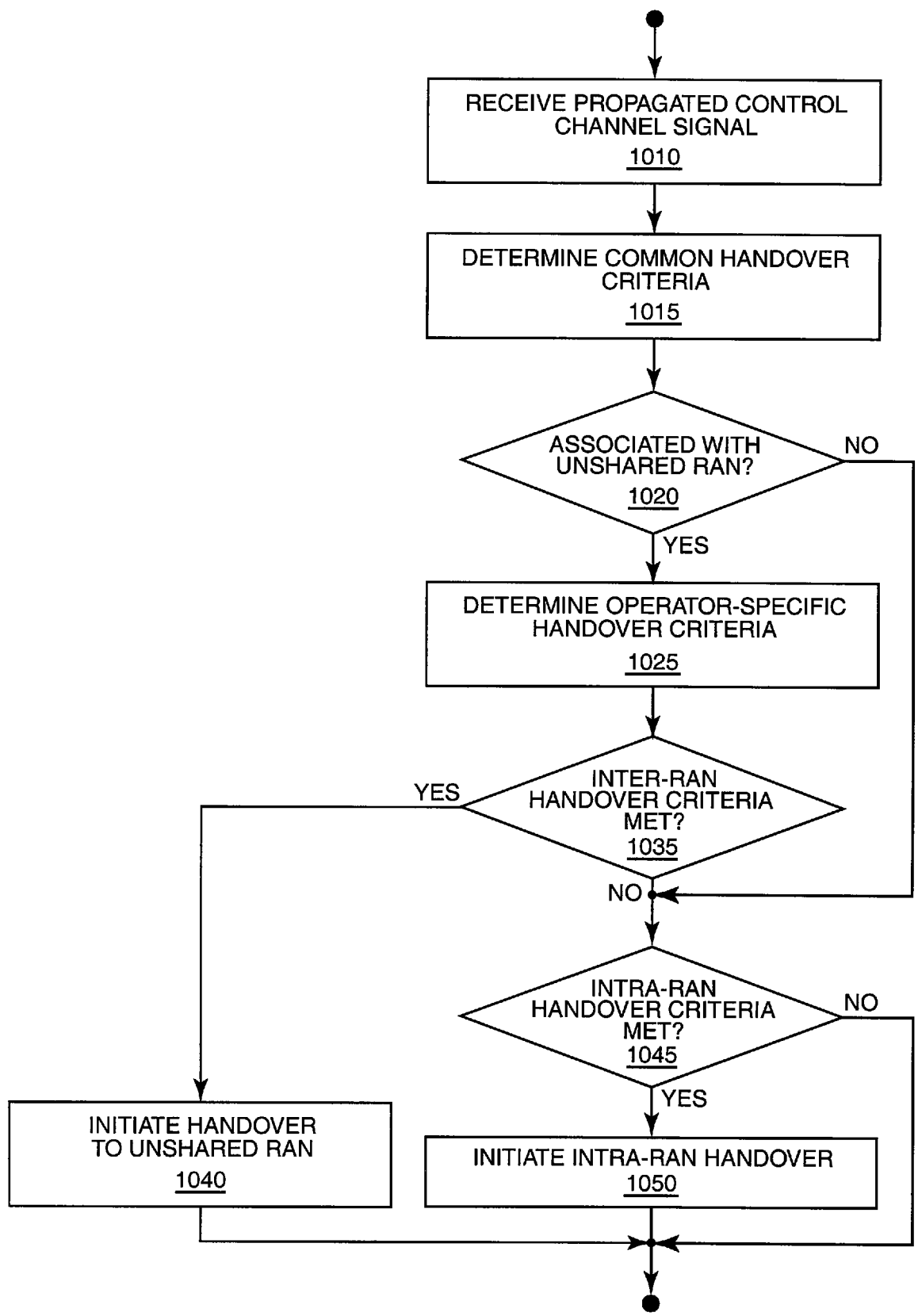
FIG. 10 is a flow diagram illustrating another exemplary method for processing a propagated control channel signal.

FIG. 10 illustrates an exemplary method for setting handover criteria, in accordance with one or more embodiments of the invention. As with the previous examples, the propagated control channel signal 610 is received, at block 1010. At block 1015, common handover criteria 642 are determined, using common control data 610. At block 1020, mobile terminal 580 determines whether it is associated with an unshared RAN; if so, mobile terminal 580 determines operator-specific handover criteria 652 from operator-specific data 620 at block 1025.

Operator-specific handover criteria 652 may comprise one or both of at least two types of criteria. First, operator-specific handover criteria 652 may modify intra-RAN handover criteria that would otherwise be governed by common handover criteria 642. In other words, common control data 610 may include various criteria that regulate measurements of neighbor cells, reporting of measurement data, and the initiation of mobile-initiated handovers. This criteria included in the common control data is generally for use by all mobile terminals accessing the shared RAN, and generally regulates intra-RAN handovers, i.e. handovers within the shared RAN. In some embodiments of the present invention, however, the operator-specific handover criteria 652 may over-ride the common handover criteria 642. For example, common handover criteria 642 may specific a first value for a received signal threshold for triggering handovers, while operator-specific handover criteria 652 may specify a second. Thus, mobile terminals associated with the unshared RAN use the operator-specific handover criteria 652, including the second threshold value, instead of the common handover criteria 642, including the first threshold value, for handovers within the shared RAN.

Operator-specific handover criteria 652 may also be of a second type, however. This second type of operator-specific handover criteria 652 regulates behavior of mobile terminal 580 with respect to inter-RAN handovers, i.e. handovers to the unshared RAN. These criteria, of course, are for use only by mobile terminals associated with the unshared RAN. Again, the common handover criteria 642 may specify, for example, a received signal threshold for triggering intra-RAN handovers. Operator-specific handover criteria 652 may specify a different received signal threshold for triggering inter-RAN handovers. Operator-specific handover criteria 652 may comprise one or both of these types of criteria.

If mobile terminal 580 is associated with the unshared RAN, processing continues at decision block 1035, where the inter-RAN handover criteria are evaluated. If the inter-RAN handover criteria are met, then a handover to the unshared RAN is initiated at block 1040, and mobile terminal begins operation on the unshared RAN. If the inter-RAN handover criteria are not met, then the intra-RAN handover criteria are evaluated at block 1045. If the intra-RAN handover criteria are met, then an intra-RAN handover, i.e., a handover within the shared RAN, is initiated at block 1050. If mobile terminal 580 is not associated with the unshared RAN (as determined at block 1020), then evaluation of operator-specific handover criteria is skipped completely; only the intra-RAN criteria are evaluated, at block 1045.

Figure 11:
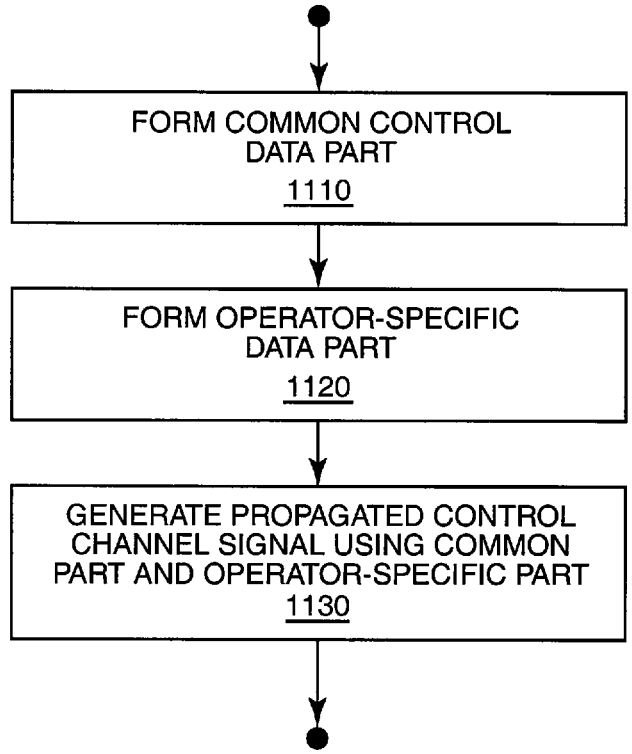
FIG. 11 is a flow diagram illustrating an exemplary method for generating a propagated control channel signal according to one or more embodiments of the invention.

FIG. 11 illustrates an exemplary method for generating a propagated control channel signal, such as might be carried out at a base station or radio network controller of a shared RAN having overlapping coverage with an unshared RAN. At block 1110, a common control data part is formed, containing data for use by mobile terminals authorized to access the shared RAN. This common control data part may contain any or all of the common data elements discussed above, including common handover criteria 642, common neighbor list 644, and other common control data 646. Thus, forming the common control data part may include combining handover-related data with other mobile terminal settings data, for use by mobile terminals accessing the shared RAN.

At block 1120, an operator-specific data part is formed, containing data for use only by those mobile terminals that are associated with a particular mobile operator. Similarly, this operator-specific data part may include one or more of the specific data types discussed above, such as operator-specific handover criteria 652, operator-specific neighbor list 654, and other operator-specific control data 656. Accordingly, forming the operator-specific data part may include combining operator-specific handover-related data with other mobile terminal settings data, for use by mobile terminals authorized to use the shared RAN.

Finally, a propagated control channel signal containing the common control data part and the operator-specific data part is generated at block 1130. As discussed above, the common control data part and the operator-specific data part are mapped to a downlink physical channel, such as the CCPCH of the LTE standard. The common control data part and operator-specific parts may be mapped to different subcarriers or different resource blocks of an OFDM signal. The common control data part may include mapping data that indicates where operator-specific data may be found in the control channel signal. Once the data parts are mapped to the physical channel, the propagated control channel is transmitted, using conventional base station transmitter equipment.

Figure 12:
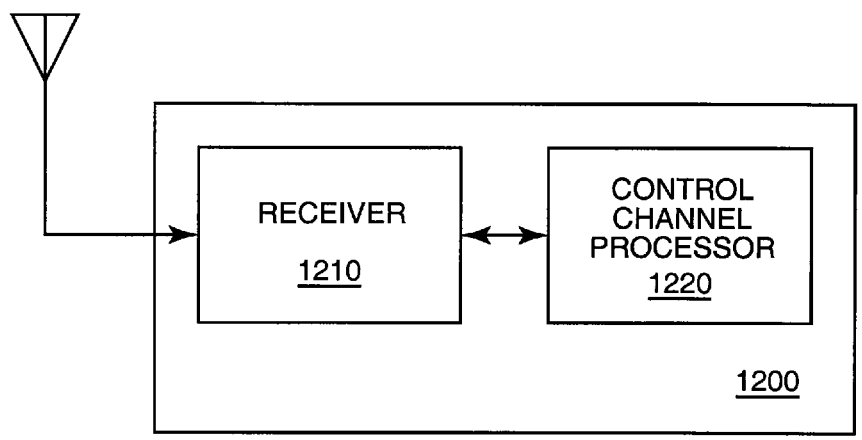
FIG. 12 is a block diagram illustrating components of an exemplary wireless device according to one or more embodiments of the invention.

FIG. 12 illustrates a wireless device configured to process a propagated control channel signal according to one or more embodiments of the present invention. Wireless device 1200 comprises a receiver 1210, configured to receive a propagated control channel signal, and a control channel processor 1220, configured to carry out one or more of the methods described above. In particular, control channel processor 1220 is configured to process common control data included in the propagated control channel signal for use by mobile terminals authorized to access a shared radio access network (RAN), determine whether the wireless device is associated with a first mobile operator, and, based on that determination, to selectively process operator-specific data included in the propagated control channel for use by those of the mobile terminals that are associated with the first mobile operator.

Those skilled in the art will appreciate that receiver 1210 may comprise radio frequency circuitry and digital baseband circuitry configured to receive, downconvert, and decode radio signals according to one or more wireless standards, such as the LTE standard under development by the $3^{rd}$-Generation Partnership Project (3GPP) and the well-known GSM standard. In particular, receiver 1210 is configured to receive and decode signals from a shared RAN, such as an LTE network, and an unshared RAN, such as a GSM network. Those skilled in the art will recognize that receiver 1210 may comprise a conventionally-designed multimode receiver platform.

Control channel processor 1220 may comprise one or more microprocessors, microcontrollers, and/or digital signal processors, configured to execute software and/or firmware contained in one or more random-access memory devices and/or read-only memory devices. One or several of the method elements described above may be implemented on one or more of these microcontrollers or microprocessors, and may be implemented together or separately, with appropriate applications program interfaces between them. One or more of these elements may be implemented on a processor that also provides receiver processing, for example.

In one or more embodiments, the control channel processor 1210 is configured to determine, from the common control data, a location within the propagated control channel signal for the operator-specific data, and to extract the operator-specific data from that location. In one or more embodiments, the receiver 1210 is configured to receive a plurality of subcarriers included within an OFDM-based carrier, and to extract the operator-specific data from one or more of those subcarriers. The appropriate subcarriers may be identified by the location data determined by control channel processor 1220.

In some embodiments of the wireless device 1200, the control channel processor 1220 may be configured to direct the receiver 1210 to scan intra-RAN handover target cells identified in common control data included in the control channel signal, and to selectively direct the receiver 1210 to scan inter-RAN handover target cells identified by operator-specific data in the control channel signal, based on whether the wireless device 1200 is associated with the operator of an unshared RAN having overlapping coverage with the shared RAN. The control channel processor 1220 may determine whether the wireless device 1200 is associated with the unshared RAN's operator by comparing PLMN information stored in a SIM card (not shown) with broadcasted PLMN information.

In other embodiments, control channel processor 1220 may be configured to selectively adjust a mobile terminal setting to either a first value included in the common control data or a second value included in the operator-specific data, depending on whether the wireless device 1200 is associated with the mobile operator corresponding to the operator-specific data. This mobile terminal setting may be, for example, a DRX-related parameter, such as a DRX cycle time.

In still other embodiments, control channel processor 1220 is configured to selectively evaluate handover criteria included in the operator-specific data, based on whether the wireless device is associated with the corresponding mobile operator, and to selectively initiate an inter-RAN handover to an inter-RAN target cell identified by the operator-specific data, based on that evaluation. This evaluation of inter-RAN handover criteria may be in addition to evaluation of intra-RAN handover criteria specified by the common control data. In some cases, the control channel processor 1220 may be configured to override common intra-RAN handover criteria with criteria included in the operator-specific data.

Thus, a propagated control channel signal for use in a shared RAN, and in particular for use in a shared RAN having overlapping coverage with one or more unshared RANs, has been described herein. Methods for generating and using such a propagated control channel signal have also been described. Finally, a wireless receiver for processing one or more of the propagated control channel signals has been described. Using the described methods, apparatus, and signals, a shared radio access network may be configured to support terminals belonging to one or more unshared RANs having overlapping coverage with the shared RAN. The exemplary sectioned common control channels described herein contain parts that are for common use by all terminals accessing the shared RAN, as well as parts that are for use only by terminals associated with particular mobile operators. Using the techniques described herein, the shared RAN can be configured to support operator-specific behavior structure for mobile terminals, especially with respect to handovers to underlying unshared RANs, while at the same time fully sharing the radio resources in the shared RAN.

Those skilled in the art will appreciate that the foregoing description and the accompanying drawings represent non-limiting examples of the methods, apparatus, and signals taught herein. Those skilled in the art will further appreciate that the present invention is not limited by the foregoing description and accompanying drawings. Instead, the invention is limited only by the following claims and their legal equivalents.

What is claimed is:

1. A method for processing a propagated control channel signal having a common part and one or more operator-specific parts distinct from the common part, comprising:
   receiving the propagated control channel signal at a wireless device;
   processing common control data included in the common part for use by mobile terminals authorized to access a shared radio access network (RAN);
   determining whether the wireless device is associated with a first mobile operator;
   based on said determining, selectively processing an operator-specific part to obtain operator-specific data included therein for use by those of the mobile terminals that are associated with the first mobile operator;
   wherein processing the common control data comprises determining, from mapping data included in the common control data, a location within the propagated control channel signal for the operator-specific part;
   wherein selectively processing the operator-specific part comprises extracting the operator-specific data from the determined location;
   wherein the determined location indicates one or more subcarriers of the propagated control channel signal;
   wherein the extracting the operator-specific data from the determined location comprises extracting operator-specific data from the indicated one or more subcarriers.

2. The method of claim 1, wherein the common control data identifies one or more intra-RAN handover target cells in the shared RAN and the operator-specific data identifies one or more inter-RAN handover target cells in an unshared RAN having overlapping coverage with the shared RAN, the method further comprising:
scanning the intra-RAN handover target cells; and
selectively scanning the inter-RAN handover target cells, based on whether the wireless device is associated with the first mobile operator.

3. The method of claim 1, wherein the common control data indicates a first value for a mobile terminal setting and the first operator-specific data indicates a second value for the mobile terminal setting, the method further comprising selectively adjusting the mobile terminal setting to the first or second value based on whether the wireless device is associated with the first mobile operator.

4. The method of claim 3, wherein the mobile terminal setting comprises a discontinuous receive (DRX) parameter, and wherein selectively adjusting the mobile terminal setting comprises setting the DRX parameter in the wireless device.

5. The method of claim 1, wherein the operator-specific data comprises service-specific data for use by those of the mobile terminals that are associated with the first mobile operator, the method further comprising selectively processing the service-specific data based on whether the wireless device is associated with the first mobile operator.

6. The method of claim 1, wherein the operator-specific data comprises one or more handover criteria for handovers to an unshared RAN having overlapping coverage with the shared RAN, the method further comprising:
selectively evaluating the handover criteria, based on whether the wireless device is associated with the first mobile operator; and
selectively initiating a handover to an inter-RAN target cell identified by the operator-specific data, based on the evaluation of the handover criteria.

7. The method of claim 1, wherein the common control data indicates a first value for a handover criterion and the operator-specific data indicates a second value for the handover criterion, the method further comprising selectively evaluating the handover criterion using the first value or the second value, based on whether the wireless device is associated with the first mobile operator.

8. The method of claim 1, wherein the common control data indicates a first value for a handover criterion and the operator-specific data indicates a second value for the handover criterion, the method further comprising using the first value for evaluating handovers within the shared RAN and using the second value for evaluating handovers to an unshared RAN having overlapping coverage with the shared RAN.

9. A wireless device, comprising
a receiver configured to receive a propagated control channel signal having a common part and one or more operator-specific parts distinct from the common part;
a control channel processor operatively connected to the receiver and configured to:
process common control data included in the common part for use by mobile terminals authorized to access a shared radio access network (RAN);
determine whether the wireless device is associated with a first mobile operator;
based on said determining, selectively process an operator-specific part to obtain operator-specific data included therein for use by those of the mobile terminals that are associated with the first mobile operator;
wherein processing the common control data comprises determining, from mapping data included in the common control data, a location within the propagated control channel signal for the operator-specific part;
wherein selectively processing the operator-specific part comprises extracting the operator-specific data from the determined location;
wherein the determined location indicates one or more subcarriers of the propagated control channel signal;
wherein the extracting the operator-specific data from the determined location comprises extracting operator-specific data from the indicated one or more subcarriers.

10. The wireless device of claim 9, wherein the common control data identifies one or more intra-RAN handover target cells in the shared RAN and the operator-specific data identifies one or more inter-RAN handover target cells in an unshared RAN having overlapping coverage with the shared RAN, and wherein the control channel processor is further configured to:
direct the receiver to scan the intra-RAN handover target cells; and
selectively direct the receiver to scan the inter-RAN handover target cells, based on whether the wireless device is associated with the first mobile operator.

11. The wireless device of claim 9, wherein the common control data indicates a first value for a mobile terminal setting and the first operator-specific data indicates a second value for the mobile terminal setting, and wherein the control channel processor is further configured to selectively adjust the mobile terminal setting to the first or second value based on whether the wireless device is associated with the first mobile operator.

12. The wireless device of claim 11, wherein the mobile terminal setting comprises a discontinuous receive (DRX) parameter and wherein the control channel processor is configured to selectively set the DRX parameter to the first or second value.

13. The wireless device of claim 9, wherein the first operator-specific data comprises service-specific data, and wherein the control channel processor is further configured to selectively process the service-specific data based on whether the wireless device is associated with the first mobile operator.

14. The wireless device of claim 9, wherein the control channel processor is further configured to selectively evaluate handover criteria included in the operator-specific data, based on whether the wireless device is associated with the first mobile operator.

15. The wireless device of claim 14, wherein the control channel processor is further configured to initiate a handover to an inter-RAN target cell identified by the operator-specific data, based on the evaluation of the handover criteria.

16. The wireless device of claim 9, wherein the common control data indicates a first value for a handover criterion and the operator-specific data indicates a second value for the handover criterion, and wherein the control channel processor is configured to selectively evaluate the handover criterion using the first value or the second value, based on whether the wireless device is associated with the first mobile operator.

17. The wireless device of claim 9, wherein the common control data indicates a first value for a handover criterion and the operator-specific data indicates a second value for the handover criterion, and wherein the control channel processor is configured to use the first value for evaluating handovers within the shared RAN and to use the second value for evaluating handovers to an unshared RAN having overlapping coverage with the shared RAN.

18. A method for producing a propagated control channel signal for use in a shared radio access network (RAN), comprising:

forming a common part having common control data for use by mobile terminals authorized to access the shared RAN;

forming a separate operator-specific part having operator-specific data for use by those of the mobile terminals that are associated with a first mobile operator;

generating the propagated control channel signal from the common control part and the operator-specific part;

including mapping data in the common control data indicating a location within the propagated control channel signal for the operator-specific part;

wherein the location is one or more subcarriers of the propagated control channel signal.

19. The method of claim 18:

further comprising determining first handover-related data for handovers within the shared RAN;

further comprising determining second handover-related data for handovers to an unshared RAN having overlapping coverage with the shared RAN;

wherein forming a common control part comprises forming the common control part using the first handover-related data;

wherein forming an operator-specific part comprises forming the operator-specific part using the second handover-related data.

20. The method of claim 18:

wherein forming a common control part comprises forming the common control part using a first value corresponding to a mobile terminal setting;

wherein forming an operator-specific part comprises forming the operator-specific part using a second value for the mobile terminal setting, wherein the second value is for use instead of the first value by those of the mobile terminals that are associated with the first mobile operator.

* * * * *

UNITED STATES PATENT AND TRADEMARK OFFICE
CERTIFICATE OF CORRECTION

PATENT NO. : 8,554,209 B2  
APPLICATION NO. : 11/840496  
DATED : October 8, 2013  
INVENTOR(S) : Westerberg Page 1 of 1

It is certified that error appears in the above-identified patent and that said Letters Patent is hereby corrected as shown below:

In the Specification

Column 6, Line 10, delete "(RAN)/" and insert -- (RAN). --, therefor.

Column 13, Lines 32-33, delete "control channel processor 1210" and insert -- control channel processor 1220 --, therefor.

In the Claims

Column 15, Line 51, in Claim 9, delete "comprising" and insert -- comprising: --, therefor.

Signed and Sealed this  
Fifteenth Day of April, 2014

Michelle K. Lee  
*Deputy Director of the United States Patent and Trademark Office*